(12) United States Patent
Boewing

(10) Patent No.: US 10,519,774 B2
(45) Date of Patent: Dec. 31, 2019

(54) ROTOR ARRANGEMENT FOR A TURBOMACHINE AND COMPRESSOR

(71) Applicant: MTU Aero Engines AG, Munich (DE)

(72) Inventor: Stefan Boewing, Munich (DE)

(73) Assignee: MTU Aero Engines AG, Munich (DE)

( * ) Notice: Subject to any disclaimer, the term of this patent is extended or adjusted under 35 U.S.C. 154(b) by 879 days.

(21) Appl. No.: 15/133,406

(22) Filed: Apr. 20, 2016

(65) Prior Publication Data

US 2016/0326877 A1  Nov. 10, 2016

(30) Foreign Application Priority Data

May 7, 2015 (EP) ..................... 15166682

(51) Int. Cl.
| | |
|---|---|
| *F01D 5/02* | (2006.01) |
| *F01D 5/06* | (2006.01) |
| *F01D 5/34* | (2006.01) |
| *F01D 25/00* | (2006.01) |
| *F04D 29/32* | (2006.01) |
| *F04D 29/70* | (2006.01) |

(52) U.S. Cl.
CPC ............ *F01D 5/027* (2013.01); *F01D 5/06* (2013.01); *F01D 5/34* (2013.01); *F01D 25/002* (2013.01); *F04D 29/321* (2013.01); *F04D 29/701* (2013.01); *F05D 2220/32* (2013.01); *F05D 2240/24* (2013.01); *F05D 2240/60* (2013.01)

(58) Field of Classification Search
CPC ...... F01D 5/027; F01D 5/3015; F01D 11/001; F01D 25/04; F01D 25/06

USPC .......................................... 416/144
See application file for complete search history.

(56) References Cited

U.S. PATENT DOCUMENTS

| | | | | |
|---|---|---|---|---|
| 3,754,433 | A * | 8/1973 | Hyer | G01B 13/12 415/14 |
| 4,667,532 | A | 5/1987 | Holz et al. | |
| 5,388,963 | A * | 2/1995 | Dimmick, III | F01D 5/066 416/198 A |
| 7,364,402 | B2 * | 4/2008 | Brault | F01D 5/027 415/174.5 |
| 8,025,483 | B2 * | 9/2011 | Blanchard | F01D 5/027 416/144 |
| 2004/0156708 | A1 * | 8/2004 | Allam | B23P 6/002 415/144 |
| 2010/0316496 | A1 * | 12/2010 | Williams | F01D 5/027 416/144 |
| 2011/0193293 | A1 | 8/2011 | Mega et al. | |

FOREIGN PATENT DOCUMENTS

| | | |
|---|---|---|
| DE | 102008037509 A1 | 5/2009 |
| EP | 1188900 A2 | 3/2002 |
| EP | 1445422 A2 | 8/2004 |
| EP | 1795702 A2 | 6/2007 |
| EP | 1878871 A1 | 1/2008 |

(Continued)

*Primary Examiner* — Carlos A Rivera
*Assistant Examiner* — Cameron A Corday
(74) *Attorney, Agent, or Firm* — Barlow, Josephs & Holmes, Ltd.

(57) ABSTRACT

The present invention relates to a rotor arrangement for a turbomachine, having a rotor with a first rotor stage, a shaft, and a first hub for joining the first rotor stage to the shaft. The first hub has a balancing device for balancing the first rotor stage. In addition, the present invention relates to a compressor.

7 Claims, 1 Drawing Sheet

(56) References Cited

FOREIGN PATENT DOCUMENTS

| EP | 2378067 | A2 | 10/2011 |
| EP | 2447472 | A2 | 5/2012 |
| EP | 2518268 | A1 | 10/2012 |

\* cited by examiner

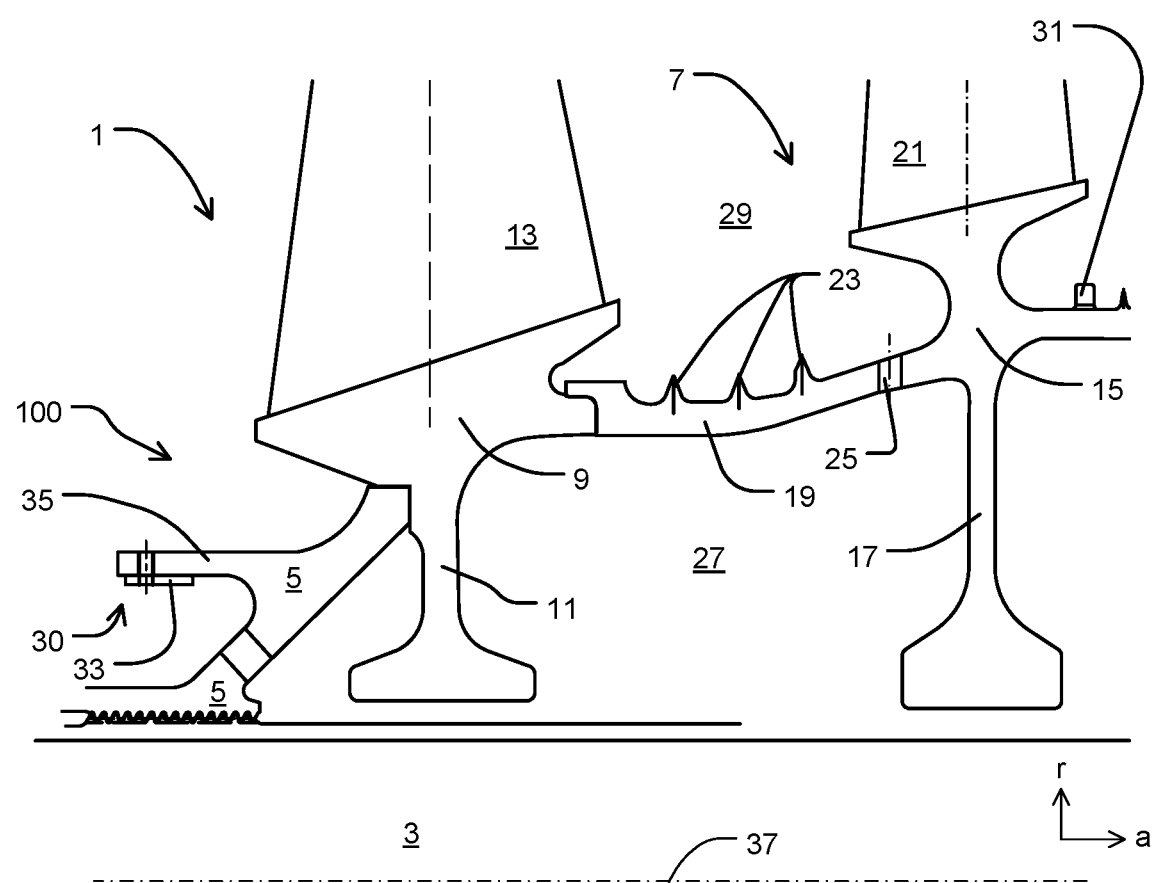

ROTOR ARRANGEMENT FOR A TURBOMACHINE AND COMPRESSOR

BACKGROUND OF THE INVENTION

The present invention relates to a rotor arrangement for a turbomachine and compressor claimed herein.

In rotors for turbomachines, in specific situations during operation, accumulations of liquids are formed in cavities of rotor spools due to centrifugal force during the operation of rotors. This accumulated liquid can flow into another region of the rotors only when the rotors are shut down and may cause various disadvantages. For example, after the rotor starts up again, oil can be distributed as a liquid into regions of the turbomachine that bring about considerable disadvantages for such oil accumulation. In one possible use of the turbomachine as an aircraft engine, the oil can enter into the cabin air via ducts in the casing when the rotors start up again and this leads to the smell of oil and contaminations therein.

SUMMARY OF THE INVENTION

An object of the present invention is to propose a rotor arrangement for a turbomachine, in which fluid accumulations can be avoided. Another object of the present invention is to propose a compressor.

The object according to the invention is achieved by a rotor arrangement and a compressor discussed in detail below.

Thus, according to the invention, a rotor arrangement having a rotor with at least one first rotor stage, a shaft, and at least one first hub for joining the first rotor stage to the shaft is proposed for a turbomachine. The first hub has a balancing device for balancing the first rotor stage.

Advantageous enhancements of the present invention are each the subject of dependent claims and embodiments.

Exemplary embodiments according to the invention may have one or more of the features named in the following.

The rotor arrangement according to the invention can be configured for an application in a high-pressure compressor, in a low-pressure compressor, in a high-pressure turbine or in a low-pressure turbine of an aircraft engine.

In several embodiments according to the invention, the turbomachine is an axial turbomachine, in particular a gas turbine, in particular an aircraft gas turbine.

The term "rotor" as it is used herein designates a rotating body in a turbomachine, which rotates around an axis of rotation or rotational axis of the turbomachine when used as intended. The rotor comprises at least one rotor stage. A rotor stage can be designated as a rotor wheel or rotor or can comprise a rotor wheel or rotor. A rotor stage comprises at least several rotating blades and a basic rotor body. The basic rotor body can be designated a disk, a rotor disk, a ring, or a rotor ring or it can comprise the latter. A rotor can comprise one or a plurality of rotor stages.

A rotor can be incorporated and mounted in a turbomachine, in particular in a gas turbine. An aircraft engine can be a gas turbine or can comprise a gas turbine. An aircraft engine can comprise a compressor having a plurality of compressor stages and a turbine having a plurality of turbine stages. Compressor stages and turbine stages can each have rotor stages and stator stages.

The rotating blades of a rotor can be designated blades and each has at least one blade element, a blade root, and a blade platform. The blades can be joined integrally to the basic rotor body or they can be joined separately, for example, in form-fitting manner by means of so-called dovetail joints, which can be dismantled again. Separate blades can be joined to the basic rotor body again in a detachable way, and/or in form-fitting manner, and/or cohesively. An integral joining is, in particular, a closed material connection. An integral joining or connection can be produced by means of an additive manufacturing method. A basic rotor body with blades joined integrally to the basic rotor body can be designated an integrally bladed rotor. An integrally bladed rotor can be a so-called BLISK (bladed disk) or a BLING (bladed ring).

The basic rotor body can comprise radially inward directed rotor disks and/or axially aligned rotor arms. The radially inward directed rotor disks can be designated prolongations or T-shaped prolongations of the rotating blades.

The rotor arms can be designated spool bodies. The rotor is configured or prepared for direct or indirect joining to a shaft of the turbomachine. An indirect joining can be executed by means of a hub and/or by means of additional rotors. In a direct joining, the rotor can be flange-mounted directly to the shaft.

The term "rotor spool" as it is used herein designates sections of at least two basic rotor bodies that are joined together axially. Rotor arms, in particular, can form a rotor spool. A rotor spool can also be formed over more than two basic rotor bodies as well as optionally over a plurality of rotor arms and rotor disks. For example, a plurality of basic rotor bodies of an eight-stage compressor can form a rotor spool in a turbomachine.

The phrases "inside space of the rotor" and "outside space of the rotor," as they are used here, designate the spaces inside and outside the rotor spool of rotors. The inside space of the rotor is thus delimited radially outwardly essentially by one or a plurality of rotor arms. In the axial direction, the inside space of the rotor is essentially delimited by rotor disks, whereby a gap is generally formed between a shaft, with which the rotor spool is joined directly or indirectly, and the rotor disks. The outside space of the rotor is delimited radially inwardly essentially by one or a plurality of rotor arms. The outside space of the rotor essentially comprises the main through-flow duct of the turbomachine. In addition, for example, inner rings of the stator can be disposed between a rotor arm and the main through-flow duct, with or without inlet seals. The inside space of the rotor and/or the outside space of the rotor can comprise a plurality of rotor stages.

Basic rotor bodies disposed axially one behind the other can be joined together by means of rotor arms and/or rotor disks. The connection is made particularly in form-fitting manner and/or in a friction fit.

In several embodiments according to the invention, the rotor arrangement according to the invention comprises at least one rotor having a first rotor stage, a shaft that drives the rotor or is driven by the rotor, as well as a first hub for joining the first rotor stage to the shaft. The first rotor stage can be the first rotor stage at the end of a compressor or of a turbine that is disposed upstream. The first rotor stage can be joined to the shaft by means of a front hub connection, which can be designated "front hub".

In certain embodiments according to the invention, at least one second rotor stage is disposed downstream of the first rotor stage. Additional rotor stages which form, for example, a six-stage or eight-stage rotor can be disposed downstream. In particular, a second hub connection, which can be designated "rear hub", and which often joins the last rotor stage to the shaft, is disposed at the end of the rotor stages. Additional hub connections of individual rotor stages to the shaft can be disposed between the first rotor stage and the last rotor stage. Individual rotor stages can be joined together in form-fitting manner and/or in a friction fit. In particular, a plurality of rotor stages joined together in form-fitting manner can be fixed in place together with a hub at the end disposed upstream and with a hub at the end disposed downstream in a friction fit. The hubs can be joined to the shaft, for example, by means of a thread connection. The rotor stages can be clamped together in a friction fit and fixed in place with these thread connections.

In some embodiments according to the invention, a balancing device on the first hub for balancing the first rotor stage can partially or completely replace a separate balancing of the first rotor stage. A partial or complete prolongation of the balancing of the first rotor stage on the adjacent hub can be utilized advantageously for the purpose of reducing or completely preventing oil accumulations caused by centrifugal force in a rotor spool joined to the first rotor stage. These types of oil accumulations can form in cavities of the rotor spool, if, for example, balancing frets or balancing flanges on the inner side of the rotor spool prevent or limit an outflow of oil into oil overflow boreholes. Oil overflow boreholes can be disposed, for example, in a rotor arm. Avoiding balancing devices in the structure inside the rotor spool and prolonging the balancing of the first rotor stage of a rotor arrangement according to the invention on the adjacent hub advantageously can reduce or eliminate an oil accumulation in the rotor spool.

Oil accumulations in the rotor spool, for example, can be caused by bearing oil from a rotor bearing. In particular, due to increased heat of friction, bearing oil can escape or evaporate from the bearing. This bearing oil or condensed bearing-oil vapor can accumulate in rotor stages or in cavities of a rotor spool indirectly or directly adjacent to the bearing.

In certain embodiments according to the invention, the first rotor stage has an integrally bladed basic rotor body or a basic rotor body with blades joined in form-fitting manner. An integrally bladed basic rotor body can be an additively manufactured rotor. Blades joined to the basic rotor body in form-fitting manner can be joined by means of a so-called dovetail joint.

In several embodiments according to the invention, the first hub comprises a balancing ring and/or balancing weights for balancing the first rotor stage. A balancing ring can be balanced, for example, by means of a material-abrading method, by grinding or milling away regions of the balancing ring at specific sites on the periphery. Balancing weights can be screwed to a balancing flange at different sites on the periphery, for example.

In specific embodiments according to the invention, the first rotor stage does not have a balancing fret and/or a balancing flange. In this case, the first rotor stage is completely or largely balanced with the balancing device or devices of the adjacent hub. However, residual imbalances of the first rotor stage may remain, which cannot be balanced by means of the balancing devices of the hub. These residual imbalances can be tolerated, in each case depending on application conditions and operating points of the turbomachine.

In some embodiments according to the invention, the first rotor stage comprises a first basic rotor body, and a second rotor stage comprises a second basic rotor body having a rotor arm that is formed as a spool body and that is designed for the form-fit and/or friction-fit joining of the first rotor stage to the second rotor stage. The rotor arm can have a radial passage opening for fluids to flow through from an inside space of the rotor into an outside space of the rotor. In addition, the rotor arm can have a balancing device on its outer side facing the main through-flow duct. The balancing device, in particular, is a balancing ring or balancing fret joined in a friction fit to the rotor arm.

Some or all embodiments according to the invention may have one, several, or all of the advantages named above and/or in the following.

By means of the rotor arrangement according to the invention and a prolonging of the balancing of the first rotor stage on the hub, oil accumulations, for example, accumulations of bearing oil, can be prevented advantageously inside a rotor spool formed at least by rotor stages. In particular, it makes possible the arrangement of a balancing ring on the radially outer side of a rotor arm, so only small cavities or in general no cavities in which oil can accumulate can form in the rotor spool. In the case of an application of the rotor spool in an aircraft engine, the possibility or danger of contaminations or an oil odor in the cabin air of airplanes due to bearing oil or bearing-oil vapor can at least be reduced thereby. Bearing oil or bearing-oil vapor in a rotating rotor spool according to the invention can be directly transported into the primary flow of the stator and rotor blading through an opening on the radius of the inner contour of the rotor spool and passed on to the discharge from the turbomachine. A possible danger of fire due to the oil can also at least be reduced based on this rapid off-transport. An accumulation of oil and/or a condensing of oil vapor during a shutdown of the rotor spool with possible subsequent transport of the oil from the main flow into branch lines for the bleed or tapped air, e.g., for the cabin air in airplanes, advantageously can be prevented.

The rotor arrangement according to the invention can be utilized in turbines and/or compressors. By means of positioning the balancing devices in the outside space of the rotor and/or on an adjacent hub, the structural space and the weight of the rotor spool can be optimized advantageously. Economic advantages can result thereby, for example, due to lower fuel consumption and/or a compact structural shape.

An arrangement of the balancing ring outside the rotor spool, and thus an arrangement on a larger diameter in comparison to an arrangement of the balancing ring inside the rotor spool, can lead to a reduction in mass and in the weight of a flange arrangement (arrangement for the flange mounting of another rotor in form-fitting manner). This can advantageously lead to a reduction in the weight of the rotor.

The rotor arrangement according to the invention makes possible a balancing directly on the hub, which joins individual rotors to a shaft, in particular, the rotor disks of a multi-stage rotor assembly disposed at the upstream and downstream ends. A balancing of these rotor stages joined to the hubs can advantageously be dispensed with. Thus, balancing time and expenditure for balancing can be reduced overall, and thus time and cost can be advantageously reduced.

BRIEF DESCRIPTION OF THE DRAWING FIGURE

The present invention will be explained by way of an example in the following, on the basis of the appended drawing.

FIG. 1 shows a rotor arrangement according to the invention having a first rotor stage, a shaft, and a hub, as well as a second rotor stage.

DESCRIPTION OF THE INVENTION

FIG. 1 shows a rotor arrangement 100 according to the invention having a first rotor stage 1, a shaft 3, and a hub 5, as well as a second rotor stage 7. The direction of throughflow of the rotor corresponds to the axial direction a. Additional coordinate axes are the radial direction r and the peripheral direction u.

The first rotor stage 1 comprises a first basic rotor body 9 having a radially inwardly directed first rotor disk 11 and an integrally joined first blade 13. The first basic rotor body 9 is joined upstream (left in FIG. 1) in form-fitting manner to the hub 5 and downstream (right in FIG. 1) in form-fitting manner to the second rotor stage 7.

The second rotor stage 7 comprises a second basic rotor body 15 with a radially inwardly directed second rotor disk 17, a spool-shaped rotor arm 19 and an integrally joined second blade 21. The second basic rotor body 15 is joined upstream in form-fitting manner to the first basic rotor body 9 by means of the rotor arm 19. The rotor arm 19 has additional sealing tips 23 for forming a gap seal opposite an inlet seal of a stator (not shown in FIG. 1) and a passage opening 25 for discharging or spinning off fluids brought about by centrifugal force from an inside space 27 of the rotor into an outside space 29 of the rotor. On the side of the second rotor stage 7 facing downstream, a balancing fret 31 is shown on the outwardly directed side of the rotor arm or the rotor spool.

The hub 5 joins the first rotor stage 1 to the shaft 3. The shaft-hub connection is executed by means of a thread. The rotor with the at least two rotor stages 1, 7 can be fixed in place by means of the thread. Another hub for an opposite fixing in place is disposed particularly on the downstream-disposed end of the rotor (not shown in FIG. 1).

In addition, as a balancing device 30, the hub 5 has at least one balancing weight 33, which is screwed onto a balancing flange 35. Additional balancing weights can be disposed over the periphery of the hub 3. The first rotor stage 1 does not have a balancing device. The first rotor stage 1 is balanced with the rotor arrangement 100 according to the invention by the balancing weight 33 and additional balancing devices of the hub 5.

The rotor rotates around the rotor axis 37 (or axis of rotation, rotational axis).

What is claimed is:

1. A rotor arrangement for a turbomachine, comprising:
   a rotor comprising a first rotor stage, a second rotor stage, a shaft, and a first hub for joining the first rotor stage to the shaft,
   wherein the first hub has a balancing device for balancing the first rotor stage,
   wherein the first rotor stage includes a first basic rotor body and does not have a balancing device disposed thereon,
   wherein the second rotor stage comprises a second basic rotor body with a rotor arm joining the first rotor stage to the second rotor stage, and
   wherein a second balancing device is disposed on a radially outer side of the second rotor stage.

2. The rotor arrangement according to claim 1, wherein the first basic rotor body is an integrally bladed basic rotor body or a basic rotor body with blades joined to the first basic rotor body in form-fitting manner.

3. The rotor arrangement according to claim 1, wherein the first hub comprises a balancing ring and/or balancing weights for balancing the first rotor stage.

4. The rotor arrangement according to claim 1, wherein the first rotor stage does not have a balancing fret and/or a balancing flange.

5. The rotor arrangement according to claim 1, wherein the rotor arm has a radial passage opening for the throughflow of fluids from an inside space of the rotor into an outside space of the rotor.

6. The rotor arrangement according to claim 1, wherein the rotor arrangement is configured and arranged for use in a compressor of a turbomachine.

7. The rotor arrangement according to claim 6, wherein the compressor is a high-pressure compressor of an aircraft engine.

* * * * *